July 26, 1927.
A. FEIGELSON
1,636,814
MOTOR VEHICLE TRAILER CONNECTION
Filed July 14, 1925   2 Sheets-Sheet 1
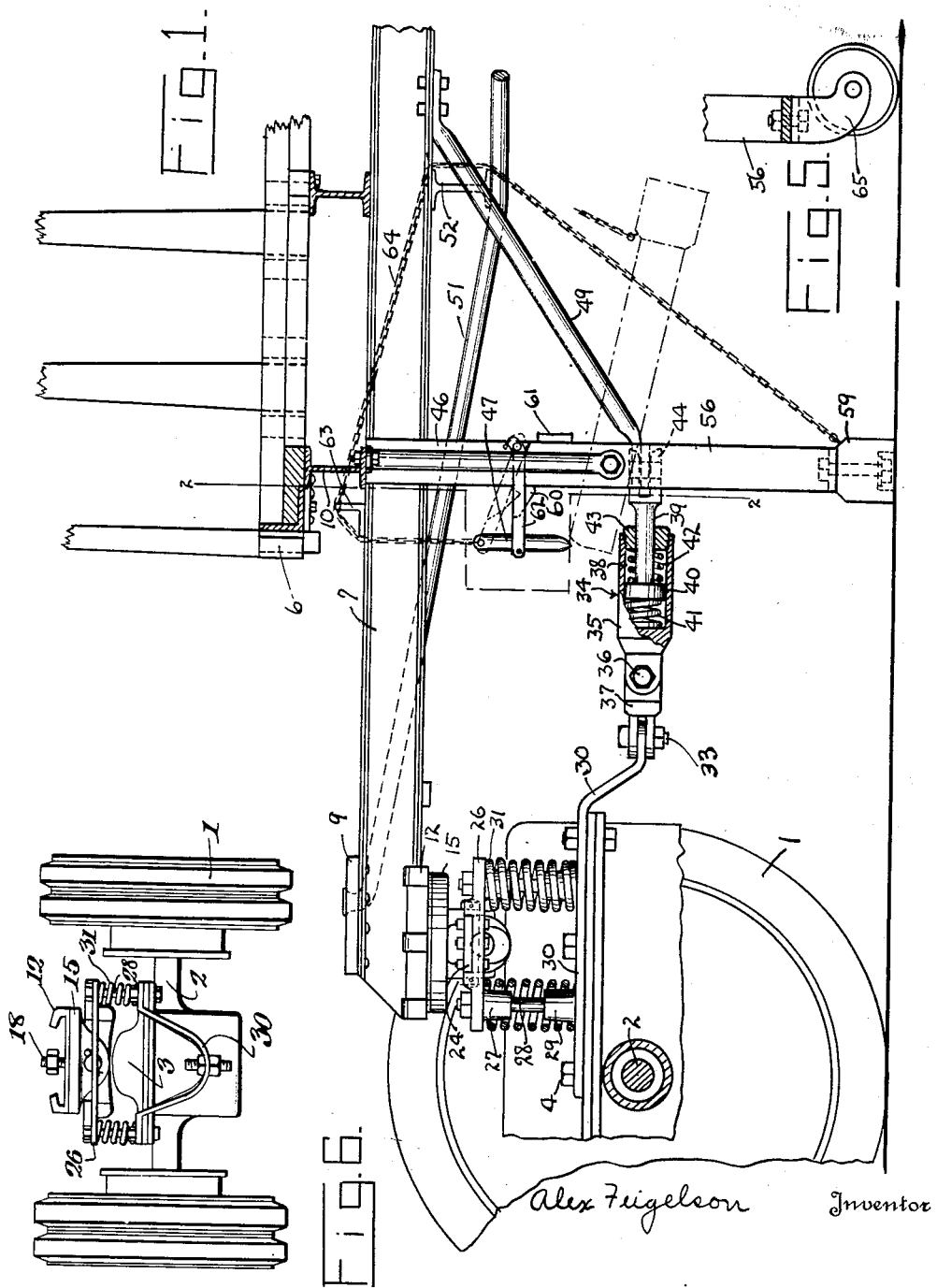
Alex Feigelson  Inventor
By Jesse R. Stone
His Attorney July 26, 1927.
A. FEIGELSON
1,636,814
MOTOR VEHICLE TRAILER CONNECTION
Filed July 14, 1925 2 Sheets-Sheet 2
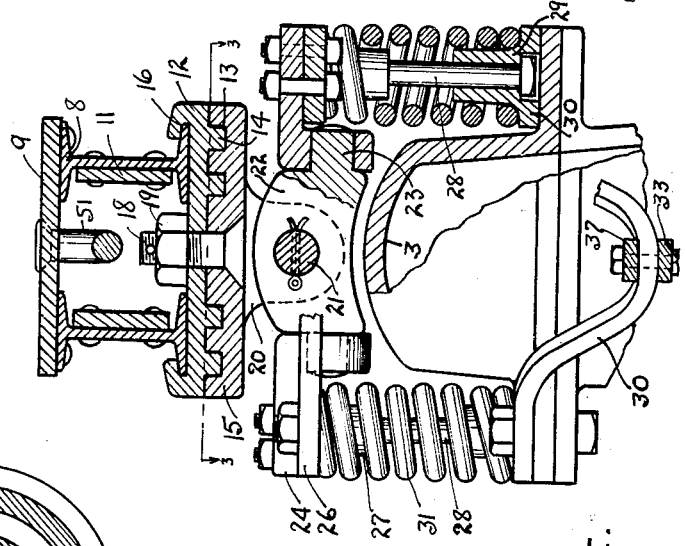
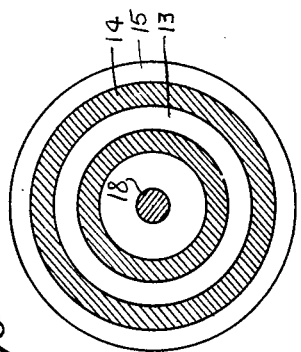
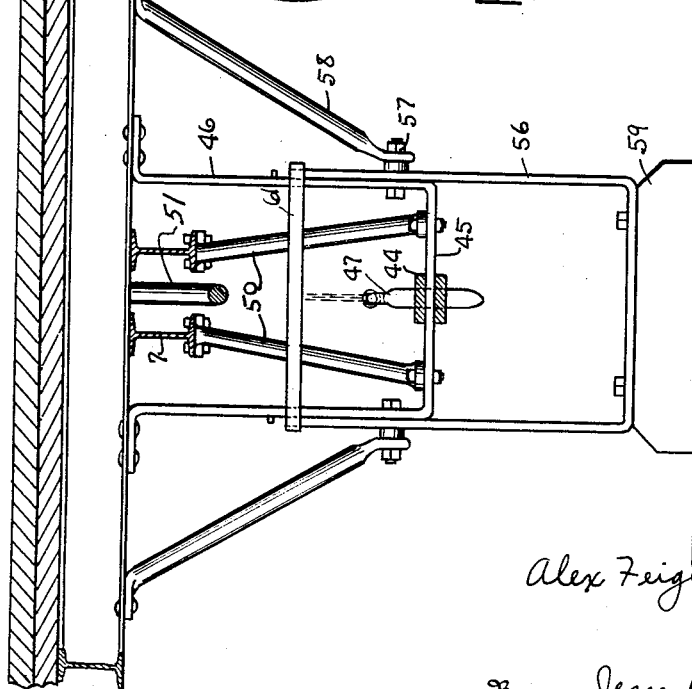
Alex Feigelson Inventor
By Jesse R. Stone
His Attorney Patented July 26, 1927.

1,636,814

UNITED STATES PATENT OFFICE.

ALEXANDER FEIGELSON, OF BEAUMONT, TEXAS.

MOTOR-VEHICLE TRAILER CONNECTION.

Application filed July 14, 1925. Serial No. 43,470.

My invention relates to a connection between a trailer and a tractor, or other similar motor vehicle. It relates particularly to the supporting and draft structures by means of which the trailer is connected to the tractor.

It is an object of the invention to provide a suitable supporting and draft connection between a trailer and a motor vehicle, such as a tractor, which will allow restricted movement of the trailer relative to the tractor, but which will serve to guide the trailer in the proper manner. It is desired that the draft connection be separate from the supporting connection and so arranged as to direct the pull of the loaded trailer relative to the tractor at a point somewhat above, or on a line with the axle of the tractor wheels.

It is also an object to provide means in connection with the support for the trailer, which will prevent the vibration and jar of the tractor from being communicated to the trailer.

It is a further object to provide an adjustable support for the forward end trailer, which may be easily and quickly adjusted into operative position, or again folded into inoperative position.

The invention consists primarily in the construction and arrangement of the parts comprising the connection between the trailer and the tractor, and these points of construction will be more clearly described and set forth in the specification which follows:

Referring to the drawing herewith, Fig. 1 is a broken section, partly in elevation, illustrating the preferred embodiment of my invention. Fig. 2 is a vertical section on the plane 2—2 of Fig. 1. Fig. 3 is a section on the plane 3—3 of Fig. 4. Fig. 4 is a rear view partly in section of the supporting connection between the tractor and the trailer. Fig. 5 is a detail of a rolling shoe which may be used with the adjustable support. Fig. 6 is a rear end view of the tractor with my support thereon. Like numerals of reference designate like parts in all the views.

In the drawing, I have illustrated a preferred embodiment of my invention, the tractor wheel being shown at 1 mounted upon an axle 2 with the usual housing and driving connections, such as are common on tractors of this type. The rear end of the differential gear housing is shown at 3. The upper portion of this housing is secured detachably upon the lower portion by means of clamping bolts 4 extending through the marginal flanges, indicated at 5.

The trailer is shown with its forward end 6 spaced somewhat to the rear of the tractor, and the supporting connection is made through a forwardly extending supporting member 7, which I will term the reach. This supporting member is made up of two parallel I-beams 8, spaced slightly apart at their forward ends by a transverse plate 9, which is bolted thereto. The said beams extend under the trailer body for a sufficient distance to form a firm mounting for the body of the trailer. The said I-beams are connected to transverse spaced I-beams, or channel irons 10, of ordinary construction, upon the trailer body. The reach thus forms a portion of the frame work of the trailer.

The two I-beams are reinforced on their inner sides by longitudinal bars 11, secured to the web between the upper and lower sides of the beams. The lower spaced sides of the beams are supported upon an approximately rectangular plate 12, which forms a sort of trailer transom plate. It has on its lower side a plurality of circular tongues or ridges 13, adapted to interfit in grooves 14 on a lower tractor transom plate 15. The plate 12 has its upper lateral margins bent inwardly to provide a groove 16 to slidably receive the sides of the I-beams, as shown in Fig. 4 of the drawing. The two plates are held rotatably together by means of a king-pin 18, secured in position by a nut 19 thereon. The lower plate 15 is provided with a pair of downwardly extending lugs 20, which are spaced apart and provided with aligned openings to receive a bearing pin 21 upon which the plate 15 may rock.

The pin 21 is supported intermediate its ends upon an oscillating yoke 22. The two lugs 20 straddle this yoke and the pin 21 extends through a central opening formed in the upper portion of the yoke 22. Said pin 21 is parallel with the axis of the reach and thereby allows the reach and the plate upon which it is mounted to sway laterally. The yoke 22 has laterally extending trunnions 23 at each side thereof, said trunnions being supported for rotation in bearing arms 24, one of said arms being provided at each end of the yoke The arms 24 are angle-shaped, the inner ends being bent downwardly and provided with bearing openings to receive the trunnions. The upper portions are arranged horizontally and are firmly attached to a supporting spider 26.

The spider 26 comprises a plate cut away centrally to receive the yoke 22. It is provided on its lower side with four downwardly extending bosses 27, each of which has an opening therethrough to allow the passage of a bolt or pin 28.

The pins 28 are supported at their lower ends in bosses 29 formed as an upper extension upon a draw yoke 30. The heads of the bolts are countersunk on the lower sides of the yoke and extend upwardly through said bosses, and the bolts are secured at the upper ends in the spider 26. The connection at the upper ends of the bolts is a slidable one so that there may be a vertical play between the spider 26 and the yoke 30. Compression springs 31 are provided between the spider 26 and the yoke 30 to space the same resiliently apart. The spider is therefore resiliently supported on the four springs thus provided so that the jars and vibrations from the tractor will not be communicated to the trailer.

The support thus provided is not intended to sustain the draft from the tractor to the trailer. This is accomplished through a draw bar connected with the yoke 30. Said yoke is U-shaped in general form and is adapted to straddle the upper end 3 of the gear housing and to be secured on said housing by means of the bolts 4, previously referred to. The rear end of the U-shaped draw yoke may be curved downwardly into line with the axle 2 and is formed with an opening therein to receive a connecting pin 33, which serves to attach thereto a draft connection, indicated generally at 34. This draft connection comprises a sleeve 35, which is pivoted at 36 to a clevis 37. Said clevis straddles the forward end of the yoke 30 and is pivoted on the pin 33, previously referred to. The forward end of the sleeve 35 has a tubular recess, or cylinder, 38 therein to receive a draw bar 39, the head 40 of which fits closely within said recess. A spring 41 cushions the action of the head 40 on one side and the spring 42 serves the same purpose on the opposite side of said head. Said spring 42 bears at its outer end against the threaded plug 43 through which the draw bar is slidable. The outer end of the draw bar is slotted horizontally at 44 to receive a cross bar 45 supported upon two legs 46 extending downwardly from the forward end of the trailer frame. A pin 47 extending through said bar 45 and the draw bar, thereby providing a pivotal connection between the tractor and the trailer frame.

The supporting frame 26 to which the tractor is connected is braced and reinforced on its rearward side by a central heavy brace bar 49 and two lateral bars 50, 50. These brace bars are secured at their upper ends to the reach 7 and to the frame of the trailer. There is also a brace rod 51, connected with the forward plate 9 on the reach and inclined downwardly below a transverse I-beam 52, and connected with the frame of the car and acting as a strut to reinforce the frame work.

I also provide an adjustable support for the forward end of the trailer when the trailer is detached from the tractor. This support is in the form of a U-shaped frame 56. The upper arms of which are pivoted on bolts, or pins, 57 extending through the lower ends of the legs 46 of the trailer frame. The support thus provided is reinforced by transverse braces 58 and may have at its lower end a shoe 59 adapted to contact with the ground, or a castor or roller 65 may be provided upon the bar 45, as indicated in Fig. 5. The upper legs of the U-shaped frame extend beyond the pivots 57 and are adapted to be latched in upright position parallel with the legs 46 by means of a latch 60. It will be noted from the drawing that when the support is in operative position, the upper ends will bear at one side against a transverse supporting bar 61 on the legs 46 of the frame, and will be held in that position by the latch 60. Said latch has a forwardly extending arm 62 thereon, which forms a lever whereby the latch may be drawn upwardly, releasing the upper arms of the supporting frame. When thus released, the lower end may be thrown rearwardly on the pivot 57 until the frame assumes a practically horizontal position out of the way.

In order to operate this supporting member, I have provided upon the trailer frame a transverse support 63 of angle iron. This transverse member has a central notch therein to receive a link of a chain 64. Said chain extends rearwardly of the frame of the trailer engaging around the beam 52, and is connected to the lower end 59 of the support. The other end of the chain falls downwardly from the latching bar 63 and is engaged with the upper head of the latching bolt 47. Thus, when the trailer is to be detached from the tractor, the chain 64 is unlatched from its position on the bar 63 and the weight of the shoe 59 upon the support will cause it to drop downwardly with some force, throwing the upper legs of the frame work against the cross bar 61 and allowing the latch 60 to drop in position, securing it in place. The dropping of the supporting yoke will exert a pull upon the chain 64, tending to withdraw the connecting pin 47 and releasing the draw bar 39.

The tractor may then be moved away from the trailer allowing the reach 7 to slide rearwardly out of the tractor transom plate 12.

In the use of my trailer connection, the draft from the tractor to the trailer will be exerted from a line approximately parallel with the axle of the tractor. The springs 41 and 42 within the draft connection will absorb shocks due to uneven movement of the tractor or the trailer relative to each other, and the movement of the draw bar within its socket will be accommodated by the sliding movement of the reach 7 in the transom plate. The supporting connection upon which the reach rests will have a universal movement, that is, it will be allowed an oscillation in any plane. It may move laterally as the tractor is turned, through the connection between the transom plates provided by the king-pin 18. It may rock laterally upon the pin 21 and may have an end-wise oscillation of the reach upon the support through the yoke 22 in the spider.

The resilient mounting of the spider upon the gear housing is of material advantage in that the vibration and shock caused by the movement of the tractor over uneven ground and through the operation of the engine will not be communicated to the reach and hence to the trailer. This will not only cause the load upon the trailer to ride more easily but will prevent crystallization of the steel frame work entering into the construction of the trailer and will thus materially prolong the life of the vehicle. The further advantages of the invention will be apparent to those skilled in the art without further description.

What I claim as new and desire to protect by Letters Patent is:

1. In a motor vehicle including a tractor having a gear housing and driving axle, and a trailer connected therewith, the combination of a draw yoke on said gear housing above said axle, a supporting transom plate mounted resiliently above said yoke, and means adapted to allow oscillation of said spider on horizontal axes and at right angles to each other, a trailer reach supported rotatably on said plate, means allowing a sliding of said reach relative to said plate, and a draw bar on said yoke below said reach detachably connected with said trailer.

2. In a motor vehicle including a tractor having a gear housing and driving axle and a trailer, the combination of a draw yoke on said gear housing above said axle, a spider supported resiliently above said draw yoke, a reach on said trailer, a transom plate slidably supporting said reach, a yoke pivoted for oscillation on said spider, a tractor transom plate pivoted on said yoke below said first mentioned plate, and a draft connection between said draw yoke and said trailer below said reach.

3. In a motor vehicle including a tractor having a driving axle and a gear case and a trailer therewith, the combination of a reach on said trailer, a plate rotatable on a vertical axis, said plate being formed to slidably receive said reach, a spider, a supporting connection between said spider and plate allowing oscillation of said plate in vertical planes at right angles to each other, a resilient support on said gear case for said spider, and a draw bar on said crank case to the rear of said axle, connecting said tractor and said trailer.

4. In a motor vehicle including a tractor and a trailer, said tractor having a driving axle and a gear housing above said axle, the combination of a forward supporting reach on said trailer, a draft yoke on said gear housing, a spider supported resiliently on said yoke, a trailer transom plate on which said reach is slidably supported, a universal connection between said plate and said spider and a draw bar connecting said yoke and said trailer.

5. In a motor vehicle including a tractor and a trailer, said tractor having a drive axle, the combination of a draft yoke secured to said tractor above and extending to the rear of said axle, a resilient draw bar between said yoke and trailer, a forward supporting reach on said trailer, a transom plate upon which said reach is slidably supported and a universal connection between said plate and said yoke said reach being longitudinally slidable relative to said tractor, in the manner described.

6. In a motor vehicle including a tractor and a trailer, the combination of a resilient draw bar between said tractor and said trailer above the drive axle of said tractor, and a supporting reach on said trailer resiliently supported on said tractor above said draw bar.

7. In a motor vehicle including a tractor and a trailer, said tractor having a gear housing, the combination of a draft connection between said trailer and said tractor, a spider, bolts extending upwardly from said gear housing and slidable in said spider, springs around said posts resiliently supporting said spider, a yoke mounted to oscillate on said spider, a tractor transom plate mounted to oscillate on said yoke, and a trailer transom plate rotatable on said tractor transom plate.

In testimony whereof I hereunto affix my signature this 10th day of July, A. D. 1925.

ALEXANDER FEIGELSON.